United States Patent [19]
Ogland et al.

[11] 3,746,840
[45] July 17, 1973

[54] RESOLUTION IMPROVEMENT FOR OPTICAL SCANNERS

[75] Inventors: Jon W. Ogland, Glen Burnie; Edward C. Malarkey, Severna Park, both of Md.

[73] Assignee: Westinghouse Electric Corporation, Pittsburgh, Pa.

[22] Filed: July 2, 1970

[21] Appl. No.: 51,962

[52] U.S. Cl. ........ 235/61.11 E, 250/227, 350/96 B, 250/219 D
[51] Int. Cl. ...................... G03b 27/00, G06k 7/10
[58] Field of Search ...................... 235/61.11 E; 250/227, 219 I, 227 X; 178/7.8; 340/146.3

[56] References Cited
UNITED STATES PATENTS

| | | | |
|---|---|---|---|
| 3,560,085 | 2/1971 | Silverberg | 350/96 B |
| 3,384,755 | 5/1968 | Williamson et al. | 250/227 |
| 3,125,683 | 3/1964 | Stewart et al. | 250/227 |
| 3,371,324 | 2/1968 | Sinoto | 235/61.115 |
| 3,150,356 | 9/1964 | Newman | 250/227 X |

*Primary Examiner*—Thomas A. Robinson
*Attorney*—F. H. Henson, E. P. Klipfel and Stanley Weinberg

[57] ABSTRACT

A device providing high resolution readout of information stored on a film. A slit equal in width to the desired spot size diameter is placed in front of a moving film. A fiber optics strip is placed in back of the film in line with the slit. A beam of light scans across the slit. The fiber optics strip is comprised of a plurality of optic fibers. The width of each fiber is also equal to the desired spot size diameter. All of the optic fibers are connected to a small group of photodetectors. The fibers and the detectors are arranged in such a manner that no one detector will receive information from more than one fiber at any one time as the beam scans across the slit.

8 Claims, 4 Drawing Figures

Patented July 17, 1973  3,746,840

INVENTORS
Jon W. Ogland &
Edward C. Malarkey.

BY Stanley Weinberg
ATTORNEY

RESOLUTION IMPROVEMENT FOR OPTICAL SCANNERS

BACKGROUND OF THE INVENTION

1. Field of the Invention

The field of art to which the invention pertains is a scanner system which allows readout of information stored on a film.

2. Description of the Prior Art

A promising application of lasers which has aroused considerable interest has been the utilization of a focused beam scanning rapidly over a photographic film to provide high resolution, rapid readout of the information stored on the film. The maximum resolution, i.e., the smallest spot to which the beam can be focused, is limited by the divergence angle of the laser beam, $\theta$, and the quality of the optical components of the system. Presently available lasers exhibit beam divergences of about 1 milliradian. As a result, the minimum spot size which can be achieved has a radius of $r = \theta f = 10^{-3} f$, where f is the focal length of the focusing lens and $r$ and $f$ are measured in the same units. Since a minimum practical focal length for the final lens in a scanning system is at least from 2 to 10 cm, the minimum spot diameter achievable with a laser source is 20 $\mu$ (micron). The problem up to now has been that high resolution photographic films are capable of resolutions of the order of 5 $\mu$ and less. Hence lasers are not yet available which will allow extractions of all the information stored on the film.

BRIEF SUMMARY OF THE INVENTION

The present invention increases the resolution capabilities in a scanner system which can use a beam of laser light or a beam of incoherent light and allows readout of all the information stored on the film down to a spot size of the order of 5 microns using the teachings of this invention, it is possible to set resolution to a spot size of 1 to 2 microns. At the same time, it will allow some relaxation of the requirements placed on the optical components of the system.

The invention described herein teaches an apparatus which provides high resolution of information in a first and second direction, the information being extracted from a moving film. Resolution in the first direction is provided by a narrow slit which is placed in front of the film — that is, between the beam of scanning light and the film. The height of the slit is equal to the desired spot size diameter.

Resolution in the second direction is provided by a fiber optics strip comprising a plurality of optically conductive fibers, which is placed on the other side of the film and in line with the slit. Therefore, when the slit is illuminated by the scanning beam, the fibers comprising the fiber optics strip are likewise, simultaneously illuminated. Each of the fibers in the fiber optics strip are of a width equal to the desired spot size diameter.

Only a small number of photodetectors are connected to the fibers comprising the fiber optics strip. Each of the fibers has first and second ends. The first ends of the fibers are divided into groups, each group being at least equal to the width of the beam of light which is incident upon them. The fibers of each group are connected to the detectors in a predetermined order. That is, the first fiber of a particular group is connected to the first detector, the second fiber of the group is connected to the second detector and so on. By requiring that the width of each group be equal at least to the width of the scanning beam of light, each detector will receive a signal from only one fiber at any given time.

BRIEF DESCRIPTION OF THE DRAWINGS

For a better understanding of the invention, reference may be had to the preferred embodiment, exemplary of the invention, shown in the accompanying drawings, in which.

DETAILED DESCRIPTION OF THE INVENTION

Figure 1:
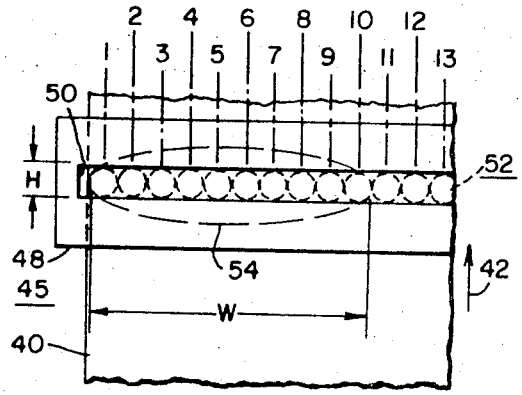
FIG. 1 shows an exploded view of the film, the slit, the fiber optics strip, and the scanning beam of light.
Figure 2:
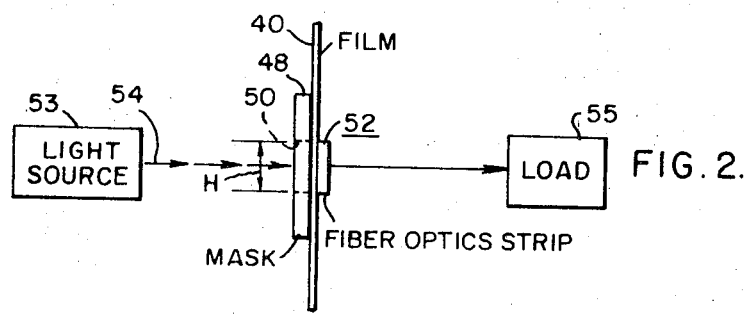
FIG. 2 is a block diagram of a preferred embodiment of the invention.

Referring to FIGS. 1 and 2, a light source 53 is shown illuminating a film 40 on which has been recorded certain information. In order to extract the information from the film, the film is moved by any well known means in the direction indicated by arrow 42 past a scanning device indicated generally at 45. However, it will be recognized by those skilled in the art that the film could be moved in the opposite direction. Furthermore, it will also be apparent that the real requirement is relative movement between the film 40 and the scanning device 45. Therefore, the film 40 can be stationary and the scanning device 45 moved in a vertical direction.

Because many high resolution photographic films are capable of resolutions of the order of 5 $\mu$, the scanning device 45 is designed to extract information of such small size and smaller sizes from the film. Readout of such high resolution is obtained in a first or vertical direction by placing an opaque mask 48 directly in front of the film. A slit 50 is provided in the mask 48. The height H of the slit 50 is equal to the desired spot size diameter. If, for example, it is known that the film 40 will contain some information on the order of 5 $\mu$, the slit 50 can be of a width of 5 $\mu$.

Figure 3:
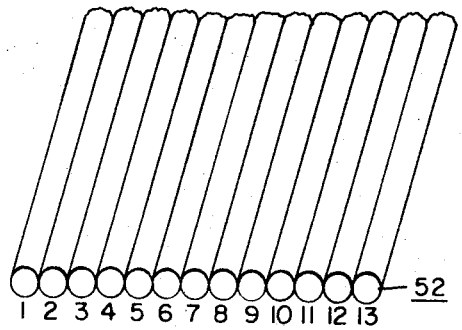
FIG. 3 shows an enlarged portion of the fiber optics strip.
Figure 4:
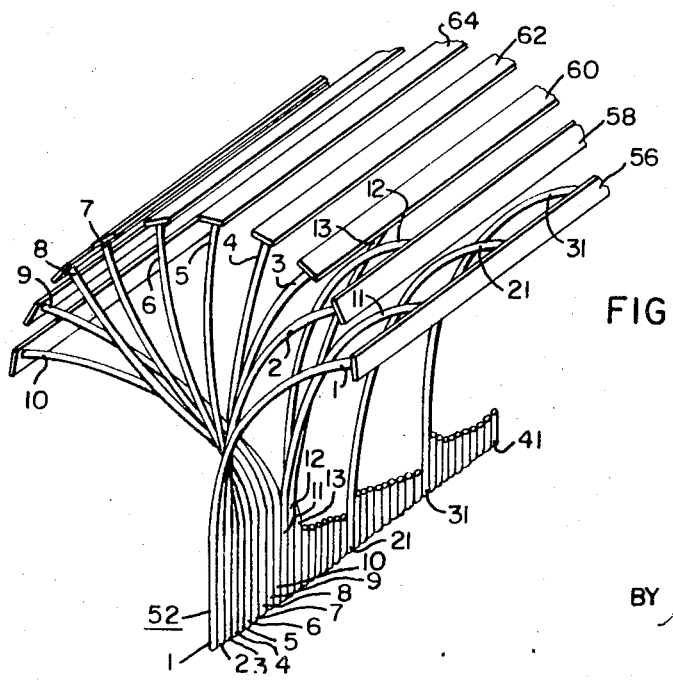
FIG. 4 shows a three-dimensional view of the fiber optics strip and a preferred manner of positioning its fibers relative to the photodetectors.

In order to get resolution in a second or horizontal direction, the line defined by slit 50 must be subdivided into elements of width equal to the required spot size diameter. To accomplish high resolution readout in the horizontal direction, a fiber optics strip 52 shown also in FIGS. 3 and 4, is placed directly behind the film and in line with the slit 50.

The sensor strip 52 may consist of as many as 10,000 fibers of light conducting material. The diameter or width of each fiber is equal to the desired spot size diameter — that is, it can be as small as 5 $\mu$ or smaller depending on the resolution of the information on the film and whether it is desired to extract it. The height of each of the fibers is not important because any excess fiber material will be blocked out by mask 48. Therefore, the fibers need only be the desired size in the horizontal direction. The second or lower ends of each of the fibers of the fiber optics strip 52 are cemented together to form a straight line. This straight line of fibers is shown as a plurality of circles across slit 50 in FIG. 1. The circles are shown by dashed lines because the fiber optics strip 52 is on the back side of the film 40. In order to read out the information contained on the film, a light beam 54 (which can be supplied by a laser or by a source of incoherent light) is scanned across the film at the level of the slit 50.

As the beam scans across the horizontal slit 50, the fibers, which are located on the other side of the film, are sequentially illuminated and transmit the information on the film to a number of photodetectors which are connected to the opposite loose ends of the fibers. Even though the beam of light 54 illuminates many of the fibers at any one time, this illumination does not decrease the resolution of the output because the resolution in the horizontal direction is determined solely by the diameter of each fiber.

If time and expense were not important factors, a separate detector could be connected to the loose ends of the fibers comprising the fiber optics strip 52. However, because these are important factors, the number of detectors that are used is markedly decreased. In order to use a small number of detectors, it is determined how wide the scanning light beam is in terms of fiber diameters. As an example, the width of the scanning beam is taken to be 10 fiber diameters as shown in FIG. 1.

As shown in FIG. 4, the first 10 fibers are taken as a group and are bent at various angles from vertical in order to identify more easily the various fibers comprising each group. It will be recognized that the group could consist of more than 10 fibers. Each of the first, or loose ends of the fibers 1 to 10 of the first group are connected to separate photodetectors. Any well known photodetectors which are capable of converting light energy to electric energy can be used. For example, FIG. 4 shows sensor strips being used as the photodetectors. The sensor strips can be connected to the fibers in any well known manner. For example, the sensor strips can be optically cemented to the fibers by a cement which has the same optical index of refraction as the fibers. Accordingly, fiber 1 is connected to sensor strip 56, fiber 2 is connected to sensor strip 58, fiber 3 is connected to sensor strip 60 and so on until all 10 fibers of the first group of fibers of the fiber optics strip have been connected to the 10 sensor strips.

After the first 10 fibers of the fiber optics strip have been connected to their respective sensor strips, a second group of 10 fibers (fibers 11 through 20) are bent out at various angles from vertical so that they too may be easily identified. Fiber 11 is then connected to sensor strip 56, fiber 12 is connected to sensor strip 58, fiber 13 is connected to sensor strip 60, and so on until all of the fibers 11 to 20, have been connected to the appropriate sensor strips. This process is repeated continuously until all of the fibers in the fiber optics strip have been broken into groups of ten and each of the fibers in each of the groups has been connected to the sensor strips in their order of rotation.

Therefore, instead of using 10,000 detectors in the case where 10,000 fibers are included in the fiber optics strip, only 10 detectors or sensor strips are needed to take care of 10 groups of fibers, each group of which comprises 1000 fibers. The 10 groups of fibers feed into the 10 sensor strips which are sequentially energized by the fibers at a rate consistent with the sweep rate of the light beam. As the beam sweeps along the slit 50, only 10 fibers will be illuminated at any one time and the output of only one fiber of a fiber group at a time will find an open gate of the utilization means 55. As shown in FIG. 2, the utilization means 55 is connected to the output of the fiber optics strip 52. That is, utilization means 55 is connected to the outputs of the sensor strips. As an example, the utilization means 55 can be a computer which is capable of "reading" the signals detected by the sensor strips. It can also be a transmitter which is capable of sending the sensor strip output signals to a receiver which will, in turn, analyze the outputs. It can, in fact, be any device which is required to analyze or reproduce the information detected by the sensor strips.

FIG. 1 shows the beam 54 illuminating fibers 1 through 10. The width W of the beam 54 is equal to the width of any group of 10 fibers. As the beam 54 scans to the right, fiber 1 will no longer be illuminated; but fiber 11 will be illuminated. Therefore, even though fibers 1 and 11 are both connected to sensor strip 56, sensor strip 56 will detect light from only one of them at a time because when number 1 fiber is illuminated, number 11 is not and when number 11 is illuminated, number 1 is not. Therefore, it is clear that, in the illustrated case, the group of fibers cannot be permitted to contain less than 10 fibers. If they did contain less than 10 fibers, the scanning beam of light would overlap adjacent groups of fibers too much, thereby causing at least one sensor to be energized by signals from more than one fiber at a time. Of course, it is the job of the utilization means 55 which is connected to the sensor strips to sort out the information and to determine which fiber is energizing which sensor strip. However, if more than one signal comes into a particular sensor strip at any one time, the electronic system cannot separate the superimposed signals and no useful information is obtained.

A system has been shown, therefore, which greatly increases the spot size resolution capability in a scanning beam system over that of the present day focused laser beams. The complexity of the optical components of the scanner system has been reduced because a much larger final beam diameter can be tolerated.

We claim as our invention:

1. A system for producing high resolution readout of information comprising a slit disposed directly across and coextensive with a source of information, said slit providing a scanning aperture enabling scanning said of information in a first direction; means for causing relative movement between said slit and said source of information; an optical device disposed directly behind said source of information and in line with said slit for providing a readout in a second direction, said optical device including a plurality of optically conductive fibers arranged to form a plurality of groups, each of said groups being composed of a predetermined number of said fibers, and a set of detectors connected to said groups of fibers, the number of detectors composing said set of detectors being equal to said predetermined number of fibers which compose each group; and means for sweeping a beam of light across said source of information through said slit and upon said device for scanning in said second direction, the width of said beam of light being equal to the width of any group of fibers.

2. The system of claim 1 wherein the width of said slit is equal to a predetermined spot size diameter.

3. The system of claim 2 wherein each of the fibers of the first group is connected to a different detector of said set of detectors.

4. The system of claim 3 wherein each of the fibers of said first group is connected to said detectors in a predetermined order.

5. The system of claim 4 wherein the fibers in the remaining groups are connected to said set of detectors in said predetermined order.

6. The system of claim 5 wherein the width of each fiber is equal to the desired spot size diameter.

7. The system of claim 1 including a utilization means, said utilization means being connected to said detectors.

8. The system of claim 6 wherein said plurality of optically conductive fibers are arranged in a straight line so as to be aligned with said slit.

* * * * *